United States Patent
Maeda et al.

(10) Patent No.: US 9,897,029 B2
(45) Date of Patent: Feb. 20, 2018

(54) CONTROL APPARATUS FOR INTERNAL COMBUSTION ENGINE

(71) Applicant: Toyota Jidosha Kabushiki Kaisha, Toyota-shi (JP)

(72) Inventors: Toshio Maeda, Toyota (JP); Toshio Takaoka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 98 days.

(21) Appl. No.: 14/736,696

(22) Filed: Jun. 11, 2015

(65) Prior Publication Data

US 2015/0361911 A1 Dec. 17, 2015

(30) Foreign Application Priority Data

Jun. 13, 2014 (JP) .................................. 2014-122116

(51) Int. Cl.
*F02D 41/22* (2006.01)
*F02D 41/14* (2006.01)
*F02D 41/06* (2006.01)

(52) U.S. Cl.
CPC ......... *F02D 41/22* (2013.01); *F02D 41/1497* (2013.01); *F02D 41/062* (2013.01); *F02D 2200/1012* (2013.01); *Y02T 10/40* (2013.01)

(58) Field of Classification Search
CPC .................... F02D 41/1497; F02D 2200/1004
USPC ...................................................... 123/197.4
See application file for complete search history.

(56) References Cited

U.S. PATENT DOCUMENTS

| | | | | |
|---|---|---|---|---|
| 6,055,852 | A * | 5/2000 | Wang .................... | G01M 3/025 73/114.22 |
| 2001/0027785 | A1* | 10/2001 | Almkvist .............. | F02D 35/023 123/675 |
| 2009/0192733 | A1* | 7/2009 | Bethmann ........... | G01M 15/046 702/51 |
| 2010/0258079 | A1* | 10/2010 | Ott ......................... | F01L 1/181 123/321 |

FOREIGN PATENT DOCUMENTS

JP 2005-264853 9/2005

* cited by examiner

*Primary Examiner* — Marguerite McMahon
*Assistant Examiner* — James Kim
(74) *Attorney, Agent, or Firm* — Oblon, McClelland, Maier & Neustadt, L.L.P.

(57) ABSTRACT

A control apparatus for an internal combustion engine, the internal combustion engine including a plurality of cylinders, and the control apparatus including: an electronic control unit configured to: a) determine whether or not acceleration of a crank shaft at compression top dead center is equal to or greater than a threshold value; b) determine that a compression loss has occurred in the cylinder, when the acceleration of the crank shaft is equal to or greater than the threshold value; and c) prohibit the determination of compression loss, when acceleration of rotation of the crank shaft at compression top dead center has occurred a first specific number of times consecutively in the plurality of cylinders.

5 Claims, 3 Drawing Sheets

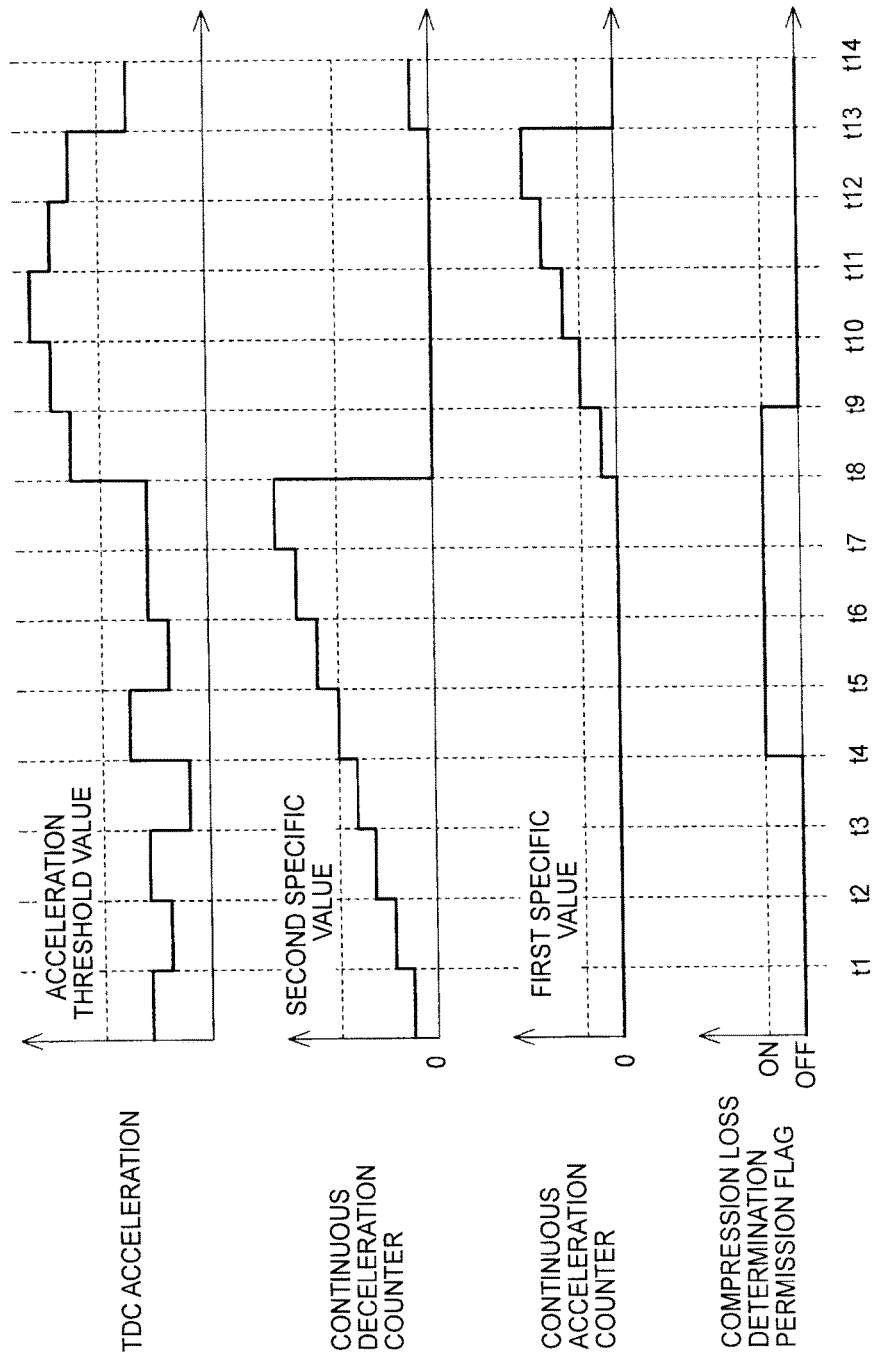

CONTROL APPARATUS FOR INTERNAL COMBUSTION ENGINE

INCORPORATION BY REFERENCE

The disclosure of Japanese Patent Application No. 2014-122116 filed on Jun. 13, 2014 including the specification, drawings and abstract is incorporated herein by reference in its entirety.

BACKGROUND OF THE INVENTION

1. Field of the Invention

This invention relates to a control apparatus for an internal combustion engine.

2. Description of Related Art

A device for detecting abnormalities occurring in an internal combustion engine has been available in the related art. For example, Japanese Patent Application Publication No. 2005-264853 (JP 2005-264853 A) discloses a configuration for identifying a cylinder in which gas leaking from a combustion chamber, and so-called compression loss (leaking of compressed air), occurs. In a normal cylinder, a reaction force created by the compressed air acts during the compression phase, and therefore the speed of rotation of the crank shaft becomes lower as the piston approaches the compression top dead center (TDC). However, since the reaction force is not liable to occur when compression loss occurs in the cylinder, then the amount of reduction in the speed of rotation of the crank shaft when the piston approaches the compression TDC becomes smaller. On the basis of this principle, the determination of compression loss which is disclosed in JP 2005-264853 A is carried out by comparing the amount of reduction in the speed of rotation of the crank shaft, in the compression phase of each cylinder.

SUMMARY OF THE INVENTION

Change in the behavior of the speed of rotation of the crank shaft may occur due to change in the operating state of the internal combustion engine, and not only due to the effects of compression loss. For instance, during the increase in speed of rotation when starting up the internal combustion engine, even if there is no compression loss and a reaction force occurs due to the air, the speed of rotation of the crank shaft increases continuously. Therefore, in the case of a configuration where compression loss is determined simply on the basis of the fact that the amount of reduction in the speed of rotation of the crank shaft is small, it is mistakenly determined that a compression loss has occurred despite the fact that a compression loss has not actually occurred. When the speed of rotation of the crank shaft increases continuously, for instance, during start-up of the internal combustion engine, then there is a risk that this mistaken determination will be made in a continuous fashion.

This invention provides a control apparatus for an internal combustion engine whereby it is possible to prevent the continuous occurrence of mistaken determination of compression loss.

In the control apparatus for an internal combustion engine according to one embodiment of this invention, the internal combustion engine includes a plurality of cylinders, and the control apparatus includes: an electronic control unit configured to: a) determine whether or not acceleration of a crank shaft at compression TDC is equal to or greater than a threshold value; b) determine that a compression loss has occurred in the cylinder, when the acceleration of the crank shaft is equal to or greater than the threshold value; and c) prohibit the determination of compression loss, when acceleration of rotation of the crank shaft at compression TDC has occurred a first specific number of times consecutively in the plurality of cylinders.

For instance, during the increase in speed of rotation when starting up the internal combustion engine, even if there is no compression loss and a reaction force occurs due to the air in the compression phase, the speed of rotation of the crank shall increases continuously. In other words, when acceleration of the rotation of the crank shaft occurs at compression TDC in a plurality of cylinders, when there is a possibility that acceleration of rotation of the crank shaft is occurring at compression TDC due to a reason other than compression loss. In this case, there is a risk of mistaken determination being made in a continuous fashion, if the determination of compression loss is carried out on the basis of the fact that the acceleration of rotation of the crank shaft at compression TDC is equal to or greater than a threshold value.

On the other hand, according to the configuration described above, it is possible to prohibit compression loss determination by the determination unit in cases where there is a possibility of acceleration of the rotation of the crank shaft occurring at the compression TDC, due to reasons other than compression loss. Therefore, it is possible to suppress continuous occurrence of mistaken compression loss determination.

In one example of the control apparatus for an internal combustion engine, the first specific number of times may be two times. In the configuration described above, determination of compression loss by the electronic control unit (determination unit) is prohibited in cases where acceleration of the rotation of the crank shaft has occurred consecutively at compression TDC in two cylinders. In other words, determination of compression loss is prohibited in cases where acceleration of the rotation of the crank shaft has occurred at the compression TDC of one cylinder, and then acceleration of the rotation of the crank shaft occurs at the compression TDC of the cylinder which performs the compression phase subsequently to that one cylinder. When acceleration of rotation of the crank shaft occurs at the compression TDC in two cylinders, there is a high probability that the acceleration is due to another reason rather than compression loss in the cylinders. Therefore, according to the configuration described above, it is possible to prevent the implementation of compression loss determination by the determination unit, when there is a high probability that the acceleration of the rotation of the crank shaft is occurring due to a reason other than compression loss.

In one example of the control apparatus for an internal combustion engine, the electronic control unit may be configured to cancel the prohibition of the determination of compression loss, when deceleration of rotation of the crank shaft at compression TDC has occurred a second specific number of times consecutively in the plurality of cylinders.

When deceleration of the rotation of the crank shaft at the compression TDC occurs consecutively in a plurality of cylinders, then it can be inferred that a situation where there is a possibility of acceleration of the rotation of the crank shaft occurring at the compression TDC due to a reason other than compression loss has ceased to exist. According to the configuration described above, when it is inferred that a situation where there is a risk of mistaken determination has ceased to exist, then the prohibition of the determination of compression loss is cancelled, and therefore sufficient opportunity for carrying out compression loss determination can be guaranteed.

In one example of the control apparatus for an internal combustion engine, the second specific number of times may be "N−1", where "N" is the number of cylinders in the internal combustion engine. For example, even when acceleration of the rotation of the crank shaft occurs at the compression TDC of a particular cylinder, if deceleration of the rotation of the crank shaft occurs at the compression TDCs of all of the other cylinders, apart from the particular cylinder, then there is a high probability that a situation where there is a risk of mistaken determination has ceased to exist. Therefore, it is desirable to adopt a configuration wherein the second specific number of times is set to "N−1", which is the number of cylinders "N" of the internal combustion engine, minus "1", as in the configuration described above, and prohibition of compression loss determination is cancelled when deceleration has occurred consecutively "N−1" times at the compression TDC. According to the configuration described above, it is possible to ensure sufficient opportunity for compression loss determination by cancelling the prohibition of determination, when there is a high probability that a situation where there is a risk of making a mistaken determination has ceased to exist.

In one example of the control apparatus for an internal combustion engine, the electronic control unit may be configured to store the number of times that compression loss has been determined to have occurred. According to the configuration described above, since the number of times that compression loss has been determined to have occurred is stored, then it is possible to ascertain the state of the internal combustion engine on the basis of the determined number of times. When carrying out maintenance of the internal combustion engine, for instance, the state of the internal combustion engine can be determined by referring to the information stored in electronic control unit (storage unit), and accurate countermeasures corresponding to the state of the internal combustion engine can be taken.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a set of timing charts showing a relationship between the TDC acceleration, a continuous deceleration counter, a continuous acceleration counter and a compression loss determination permission flag, when executing the routine for controlling implementation of compression loss determination.

DETAILED DESCRIPTION OF EMBODIMENTS

Below, one embodiment wherein a control apparatus for an internal combustion engine is configured as an electronic control unit 10 which controls an internal combustion engine 30 mounted in a vehicle will be described with reference to FIG. 1 to FIG. 5. The internal combustion engine 30 in this embodiment is a V-type 6-cylinder engine having cylinders #1 to #6. In the description given below, the compression TDC of cylinder #1 is 0°, and the crank angle which is the angle of rotation of the crank shaft is represented as CA. Furthermore, the compression TDC is abbreviated as "TDC", where appropriate.

Figure 1:
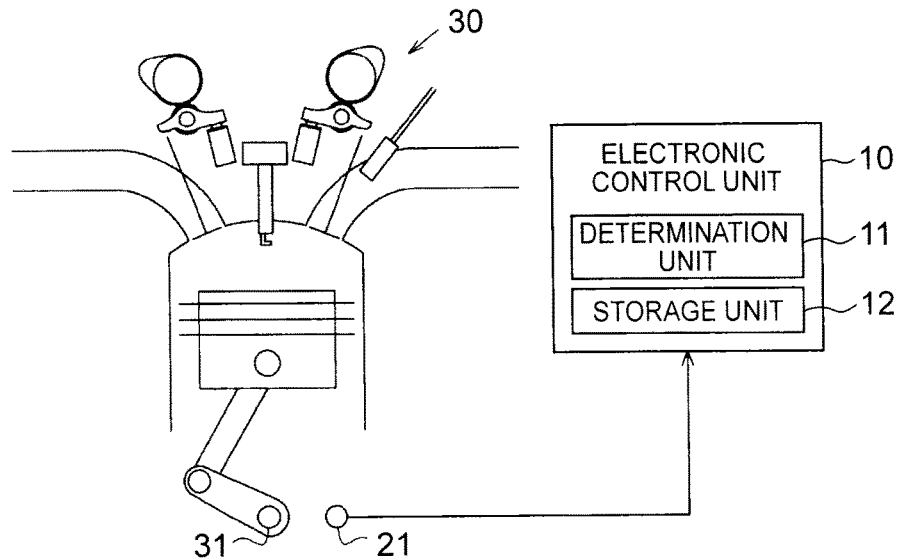
FIG. 1 is an illustrative diagram showing a configuration of an electronic control unit which is one embodiment of a control apparatus for an internal combustion engine.

As shown in FIG. 1, a crank angle sensor 21 that outputs a crank angle signal corresponding to change in the crank angle, which is the angle of rotation of a crank shaft 31 provided in the internal combustion engine 30, is connected to an electronic control unit 10. The electronic control unit 10 is provided with a determination unit 11 which determines that a compression loss has occurred in the internal combustion engine 30, and a storage unit 12 which stores the number of times that the determination unit 11 has determined that a compression loss has occurred.

The electronic control unit 10 calculates the crank angle (0° to 720° CA) which is the angle of rotation of crank shaft 31, and also calculates the speed of rotation of the crank shaft 31, on the basis of the crank angle signal output from the crank angle sensor 21. Moreover, the electronic control unit 10 calculates the momentary acceleration of the crank shaft 31, on the basis of the calculated speed of rotation of the crank shaft 31. Furthermore, the electronic control unit 10 determines the compression TDC of each cylinder on the basis of the crank angle, and sets the momentary acceleration of the crank shaft 31 at the compression TDC as the TDC acceleration. In other words, the electronic control unit 10 sets the momentary acceleration of the crank shaft 31 at 0° CA, 120° CA, 240° CA, 360° CA, 480° CA, and 600° CA, which correspond respectively to the TDC of the six cylinders, as the TDC acceleration of the cylinder corresponding to that crank angle. In order to control the implementation of compression loss determination, the electronic control unit 10 prohibits determination by the determination unit 11, and cancels the prohibition, on the basis of the set TDC acceleration.

Figure 2:
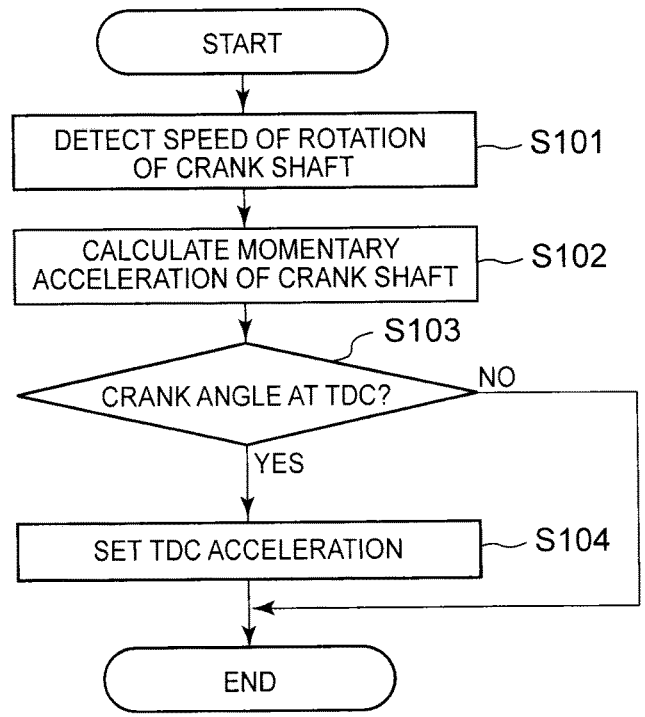
FIG. 2 is a flowchart showing a procedure of a routine by which the electronic control unit according to the embodiment sets the TDC acceleration.

Next, a process for setting the TDC acceleration as performed by the electronic control unit 10 will be described with reference to FIG. 2. The routine for setting the TDC acceleration is repeated each time the crank shaft 31 rotates through 30° CA.

Firstly, in this routine, in step S101, the rate of rotation of the crank shaft 31 is detected. More specifically, the time taken for the crank shaft 31 to rotate through 30° CA is calculated on the basis of the crank angle signal from the crank angle sensor 21. The speed of rotation of the crank shaft 31 is calculated by differentiating the amount of change in the crank angle, which is 30° CA, with respect to time.

Thereupon, in step S102, the momentary acceleration of the crank shaft 31 is calculated on the basis of the speed of rotation of the crank shaft 31 which has been calculated in step S101. More specifically, the amount of change in the speed of rotation of the crank shaft 31 is calculated from the previously calculated speed of rotation and the currently calculated speed of rotation. Thereupon, the momentary acceleration is calculated by differentiating the amount of change in the speed of rotation by the time required for the crank shaft 31 to rotate through 30° CA.

Thereupon, in step S103, it is determined whether or not the crank angle is at TDC. When the crank angle is at TDC (S103: YES), then the process in step S104 is carried out, and the momentary acceleration calculated by step S102 is set as the TDC acceleration in the cylinder which is at TDC.

When the TDC acceleration has been set in this way, this routine is provisionally terminated.

Figure 3:
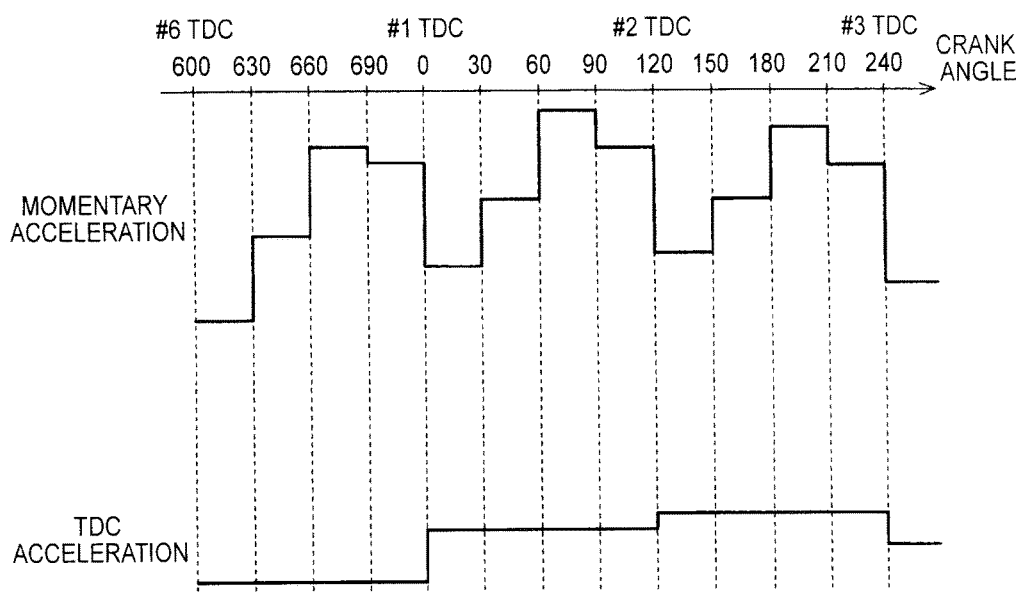
FIG. 3 is a timing chart showing a relationship between the crank angle, the momentary acceleration of the crank shaft, and the TDC acceleration.

On the other hand, if the crank angle is not at TDC (S103: NO), then this routine is terminated provisionally, without carrying out the process in step S104. By repeating this routine at intervals of 30° CA, the momentary acceleration of the crank shaft 31 at intervals of 30° CA apart is calculated by the processes in steps S101 and S102. It is determined whether or not the crank angle is at TDC by the process in step S103. Since the internal combustion engine 30 according to this embodiment is a V-type 6-cylinder internal combustion engine, then the respective crank angles at 120° CA intervals from the TDC of cylinder #1, which is at 0° CA, are defined as the TDC of the respective cylinders. When the TDC has been determined, the momentary acceleration of the crank shaft 31 calculated at that time by the process in step S104 is set as the TDC acceleration. In other words, as shown in FIG. 3, the momentary acceleration of the crank shaft 31 at 0° CA is set as the TDC acceleration of cylinder #1, and the momentary acceleration of the crank shaft 31 at 120° CA is set as the TDC acceleration of cylinder #2. In this way, each time the crank angle changes by 120° CA, the momentary acceleration of the crank shaft 31 calculated at that time is set as the TDC acceleration of the cylinder which is at TDC at that time. The respective TDC acceleration values for the cylinders #1 to #6 are set in this way.

Figure 4:
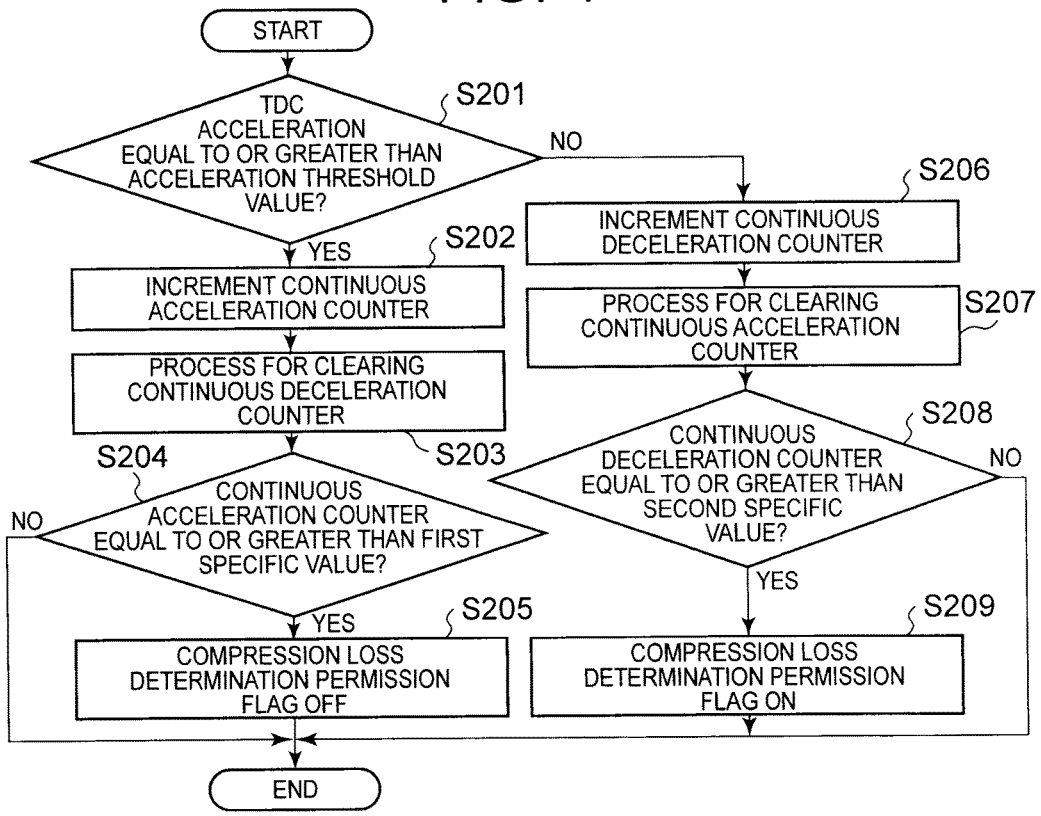
FIG. 4 is a flowchart showing a procedure of a routine for controlling implementation of compression loss determination according to the embodiment.

Next, a process for controlling the implementation of compression loss determination performed by the electronic control unit 10 is described with reference to FIG. 4. The implementation control routine relating to this implementation control process is repeated each time the TDC acceleration is set. In other words, the routine is repeated each time the crank shaft 31 rotates through 120° CA.

Firstly, in this implementation control routine, in step S201, it is determined whether or not the TDC acceleration is equal to or greater than an acceleration threshold value. In this embodiment, "0" is set as the acceleration threshold value. In other words, in step S201, the behavior of the speed of rotation of the crank shaft 31 is determined by determining whether or not the TDC acceleration is equal to or greater than "0".

When the TDC acceleration is equal to or greater than the acceleration threshold value (S201: YES), then the processing from step S202 on is carried out. On the other hand, when the TDC acceleration is smaller than the acceleration threshold value (S201: NO), then the processing from step S206 on is carried out. In step S202, the continuous acceleration counter is incremented by "1".

Subsequently, in step S203, a process for clearing the continuous deceleration counter is carried out. In other words, the continuous deceleration counter is set to "0". Next, in step S204, it is determined whether or not the continuous acceleration counter is equal to or greater than a first specific value. In this embodiment, the first specific value is set to "2". In other words, in step S204, it is determined whether or not the continuous acceleration counter is equal to or greater than "2".

When the continuous acceleration counter is equal to or greater than the first specific value (S204: YES), the procedure advances to step S205 and the compression loss determination permission flag is switched off. This routine is then terminated provisionally.

On the other hand, when the continuous acceleration counter is smaller than the first specific value (S204: NO), then the routine is terminated without carrying out the process in step S205. As explained above, in step S202, the continuous acceleration counter is incremented by "1", whereas in step S206, the continuous deceleration counter is incremented by "1".

Subsequently, in step S207, a process for clearing the continuous acceleration counter is carried out. In other words, the continuous acceleration counter is set to "0". Next, in step S208, it is determined whether or not the continuous deceleration counter is equal to or greater than a second specific value. In this embodiment, the second specific value is set to "N−1", which is the number of cylinders (N) of the internal combustion engine, minus 1. In other words, since the internal combustion engine 30 relating to this embodiment has six cylinders, then the second specific value is set to "5". In other words, in step S208, it is determined whether or not the continuous deceleration counter is equal to or greater than "5".

When the continuous deceleration counter is equal to or greater than the second specific value (S208: YES), the procedure advances to step S209, and the compression loss determination permission flag is switched on. This routine is then terminated provisionally.

On the other hand, when the continuous deceleration counter is smaller than the second specific value (S208: NO), then the routine is terminated without carrying out the process in step S209. When the compression loss determination permission flag is on, a compression loss determination process based on the behavior of the speed of rotation of the crank shaft 31 is carried out by the determination unit 11. In a normal cylinder, a reaction force created by the compressed air acts during the compression phase, and therefore the speed of rotation of the crank shaft 31 becomes slower as the piston approaches the compression TDC. However, since the reaction force is not liable to occur when there is compression loss in the cylinder, then the reduction in the speed of rotation of the crank shaft 31 when the piston approaches the compression TDC becomes smaller. Therefore, the determination unit 11, for example, monitors the change in the speed of rotation of the crank shaft 31, compares the amount of reduction in the speed of rotation of the crank shaft 31 in the compression phase of each cylinder, and determines that a compression loss has occurred in a cylinder where the amount of reduction in the speed of rotation is particularly small. More specifically, the determination unit 11 sets the compression loss determination threshold value by comparing the TDC acceleration values of each of the cylinders. The determination unit 11 determines that a compression loss has occurred in a cylinder, if the TDC acceleration for that cylinder is equal to or greater than the compression loss determination threshold value.

The storage unit 12 then stores the number of times that the occurrence of compression loss has been determined by the determination unit 11, as a number of compression loss occurrences. Next, the action which occurs when the routine described with reference to FIG. 4 is repeated will be described with reference to FIG. 5.

The timings t1 to t14 in FIG. 5 respectively indicate the timings at which the TDC acceleration is set. By way of example, a situation is depicted here in which the acceleration of the rotation of the crank shaft 31 varies in such a manner that, as shown in FIG. 5 (TDC ACCELERATION), the TDC acceleration has a value smaller than the acceleration threshold value up until the timing t7, has a value equal to or greater than the acceleration threshold value from timing t8 to t13, and has a value smaller than the acceleration threshold value again from timing t13 onwards.

At timing t1, since the TDC acceleration is smaller than the acceleration threshold value, then a negative determination is made in step S201, and the processes from step S206 on are carried out. Thereupon, as shown in FIG. 5 (CONTINUOUS DECELERATION COUNTER), the continuous deceleration counter is incremented. Before timing t1, the continuous deceleration counter is "1", and therefore at timing t1, the continuous deceleration counter becomes "2". At timings t2 to t4, each of the TDC acceleration values is smaller than the acceleration threshold value, and therefore the continuous deceleration counter is incremented as shown in FIG. 5 (CONTINUOUS DECELERATION COUNTER).

At timing t4, the continuous deceleration counter which has been incremented as shown in FIG. 5 (CONTINUOUS DECELERATION COUNTER) reaches a value of "5", which is the second specific value. In other words, at timing t4, an affirmative determination is made at step S208, and the process in step S209 is carried out. As shown in FIG. 5 (COMPRESSION LOSS DETERMINATION PERMISSION FLAG), the compression loss determination permission flag is then switched on.

At the subsequent timings t5 to t7, each of the TDC acceleration values is smaller than the acceleration threshold value, and therefore the continuous deceleration counter is incremented continuously as shown in FIG. 5 (CONTINUOUS DECELERATION COUNTER). Thereupon, at timing t8, the TDC acceleration switches from a value smaller than the acceleration threshold value, to a value equal to or greater than the acceleration threshold value. Consequently, an affirmative determination is made in step S201, and the processes from step S202 on are carried out. In other words, as shown in FIG. 5 (CONTINUOUS ACCELERATION COUNTER), the continuous acceleration counter is incremented. In this case, in step S203, a process for clearing the continuous deceleration counter is carried out, and as shown in FIG. 5 (CONTINUOUS DECELERATION COUNTER), the continuous deceleration counter becomes "0".

At the timing t9, the TDC acceleration is equal to or greater than the acceleration threshold value, and therefore the continuous acceleration counter is incremented as shown in FIG. 5 (CONTINUOUS ACCELERATION COUNTER). In other words, the continuous acceleration counter reaches "2", which is the first specific value. More specifically, at timing t9, an affirmative determination is made at step S204, and the process in step S205 is carried out. As shown in FIG. 5 (COMPRESSION LOSS DETERMINATION PERMISSION FLAG), the compression loss determination permission flag is then switched off. By switching off the compression loss determination permission flag in this way, compression loss determination ceases to be carried out by the determination unit 11. In other words, compression loss determination based on the behavior of the speed of rotation of the crank shaft 31 is prohibited.

At the subsequent timings t10 to t12, each of the TDC acceleration values is equal to or greater than the acceleration threshold value, and therefore the continuous acceleration counter is incremented continuously as shown in FIG. 5 (CONTINUOUS ACCELERATION COUNTER). Thereupon, at timing t13, the TDC acceleration switches from a value equal to or greater than the acceleration threshold value, to a value smaller than the acceleration threshold value. Consequently, a negative determination is made in step S201, and the processes from step S206 on are carried out. In other words, as shown in FIG. 5 (CONTINUOUS DECELERATION COUNTER), the continuous deceleration counter is incremented. In this case, in step S207, a process for clearing the continuous acceleration counter is carried out, and as shown in FIG. 5 (CONTINUOUS ACCELERATION COUNTER), the continuous acceleration counter becomes "0".

As described above, according to the electronic control unit 10 of this embodiment, the continuous acceleration counter and the continuous deceleration counter are increased or decreased on the basis of the TDC acceleration. Thereupon, when the continuous acceleration counter is equal to or greater than "2", then compression loss determination is prohibited. Furthermore, when the continuous acceleration counter has become equal to or greater than "5", then the prohibition of compression loss determination is cancelled. In other words, on the basis of the TDC acceleration, switchover between the prohibition of compression loss determination and the cancellation of this prohibition are enabled.

According to this embodiment which has been described above, the following beneficial effects are obtained. (1) In this embodiment, compression loss determination by the determination unit 11 is prohibited when the number of times that the TDC acceleration is consecutively equal to or greater than the acceleration threshold value is equal to or greater than a specific number of times. Therefore, it is possible to prohibit compression loss determination in cases where there is a possibility of acceleration of the rotation of the crank shaft 31 occurring at the compression TDC due to a reason other than compression loss. Therefore, the implementation of compression loss determination is suppressed when the behavior of the speed of rotation of the crank shaft 31 varies due to a reason other than compression loss. In other words, it is possible to suppress continuous occurrence of mistaken compression loss determination.

(2) It is possible to prohibit determination of compression loss when the TDC acceleration is equal to or greater than the acceleration threshold value two times consecutively. When acceleration of rotation of the crank shaft 31 occurs at the compression TDC in two cylinders, there is a high probability that this acceleration derives from reasons other than a compression loss in the cylinders. Therefore, according to this embodiment, it is possible to prevent the implementation of compression loss determination based on the behavior of the speed of rotation of the crank shaft 31, when there is a high probability that the acceleration of the rotation of the crank shaft 31 is occurring due to a reason other than compression loss.

(3) In this embodiment, the prohibition of compression loss determination is cancelled when the number of times that the TDC acceleration is consecutively smaller than the acceleration threshold value is equal to or greater than a specific number of times. When deceleration of the rotation of the crank shaft 31 at the compression TDC occurs consecutively in a plurality of cylinders, then it can be inferred that a situation where there is a possibility of acceleration of the rotation of the crank shaft 31 occurring at the compression TDC due to a reason other than compression loss has ceased to exist. Consequently, according to this embodiment, when it is inferred that a situation where there is a risk of mistaken determination has ceased to exist, then the prohibition of the determination of compression loss is cancelled, and therefore sufficient opportunity for carrying out compression loss determination can be guaranteed.

(4) It is possible to prohibit determination of compression loss when the TDC acceleration is smaller than the acceleration threshold value five times consecutively. Even when acceleration of the rotation of the crank shaft 31 occurs at the compression TDC of a particular cylinder, if deceleration of the rotation of the crank shaft 31 occurs at the compression TDCs of all of the other cylinders, apart from the particular cylinder, then there is a high probability that a situation where there is a risk of mistaken determination has ceased to exist. Consequently, by cancelling the prohibition of compression loss determination by setting a second specific value of "5", which is the number of cylinders "6" of the internal combustion engine 30, minus "1", then the prohibition of compression loss determination is cancelled when there is a high probability that a situation where there is a risk of mistaken determination has ceased to exist, and therefore sufficient opportunity for the implementation of compression loss determination can be guaranteed.

(5) Since the number of times that compression loss has been determined to have occurred is stored in the storage unit 12, then it is possible to ascertain the state of the internal combustion engine 30 on the basis of the determined number of times. When carrying out maintenance of the internal combustion engine 30, for instance, the state of the internal combustion engine 30 can be determined by referring to the information stored in the storage unit 12, and countermeasures adequate to the state of the internal combustion engine 30 can be taken.

This embodiment can also be implemented in the following modes which incorporate appropriate modifications. In the embodiment described above, the number of times that compression loss is determined to have occurred by the determination unit 11 is stored in a storage unit 12. The storage unit 12 may be configured so as to store the number of occurrences of compression loss, respectively for each cylinder. Furthermore, the storage unit 12 may also be configured so as to store the number of occurrences of compression loss in all of the cylinders.

In the embodiment described above, a value of "2" is set as the first specific value. The first specific value is not limited to "2", provided that it has a value that enables the determination of cases where there is a possibility of the TDC acceleration being equal to or greater than the acceleration threshold value, due to a reason other than compression loss.

In the embodiment described above, the second specific value is set to "N−1", which is the number of cylinders (N) of the internal combustion engine, minus 1. In order to display similar beneficial effects to the embodiment described above, it is satisfactory to be able to infer that a situation where there is a possibility of the TDC acceleration being equal to or greater than the acceleration threshold value due to a reason other than compression loss has ceased to exist. In other words, a value other than "N−1" can be set as the second specific value.

In the embodiment described above, the acceleration threshold value is set to "0", the continuous acceleration counter is incremented when the TDC acceleration is equal to or greater than "0", and the continuous deceleration counter is incremented when the TDC acceleration is less than "0". Since the acceleration threshold value is a threshold value for determining whether or not the rotation of the crank shaft 31 is accelerating, it is also possible to set the threshold value to a value other than "0". In other words, the acceleration threshold value may also be set to a value greater than "0". Furthermore, in this case, it is necessary to provide a deceleration threshold value for determining whether or not the rotation of the crank shaft 31 is decelerating, and to increment the continuous deceleration counter when the TDC acceleration is equal to or lower than this deceleration threshold value. In this case, the deceleration value should be set to a value equal to or less than "0", and preferably, a value less than "0".

In the embodiment described above, the momentary acceleration of the crank shaft 31 is calculated on the basis of the speed of rotation at intervals of 30° CA apart. Provided that the determination accuracy of compression loss determination, and the control of the implementation of compression loss determination, can be guaranteed, it is also possible to calculate the momentary acceleration on the basis of the speed of rotation at intervals of 10° CA, or 60° CA, or 90° CA, for example.

In the embodiment described above, an example is given in which compression loss determination is carried out by the determination unit 11 on the basis of the result of a comparison of the amount of reduction in the speed of rotation of the crank shaft 31 in the compression phase in each cylinder. However, the method for determining compression loss is not limited to this configuration.

The compression loss determination by the determination unit 11 can also be carried out in a portion of the cylinders only. In the embodiment described above, the object of the control of the electronic control unit 10 is an internal combustion engine 30 which is a V-type 6-cylinder engine. The control of the implementation of compression loss determination according to the embodiment described above can also be applied to an internal combustion engine having a different number of cylinders, or to an internal combustion engine having a straight cylinder alignment. In these cases also, similar beneficial effects to those of the embodiment described above can be displayed.

What is claimed is:

1. A control apparatus for an internal combustion engine, the internal combustion engine including a plurality of cylinders, and the control apparatus comprising:
    an electronic control unit configured to:
        a) determine whether or not acceleration of a crank shaft at compression top dead center is equal to or greater than a threshold value;
        b) determine that an abnormal compression loss has occurred in a cylinder when the acceleration of the crank shaft at compression top dead center is equal to or greater than the threshold value and an abnormal compression loss determination permission flag is set ON; and
        c) avoid determining that the abnormal compression loss has occurred, in a case where the acceleration of the crank shaft at compression top dead center is equal to or greater than the threshold value is caused by a reason other than the abnormal compression loss, by setting the abnormal compression loss determination permission flag to OFF when the acceleration of the crank shaft at compression top dead center is equal to or greater than the threshold value a first specific number of times consecutively in the plurality of cylinders.

2. The control apparatus according to claim 1, wherein the first specific number of times is two times.

3. The control apparatus according to claim 1, wherein the electronic control unit is configured to set the abnormal compression loss determination permission flag to ON when the acceleration of the crank shaft at compression top dead center is less than the threshold value a second specific number of times consecutively in the plurality of cylinders.

4. The control apparatus according to claim 3, wherein the second specific number of times is N−1, where N is a number of the plurality of cylinders in the internal combustion engine.

5. The control apparatus according to claim 1, wherein the electronic control unit is configured to store a number of times that the abnormal compression loss is determined to have occurred.

* * * * *